Nov. 20, 1962 R. E. ROARK 3,064,725
AUTOMOBILE WINDOW SCREEN
Filed April 20, 1960
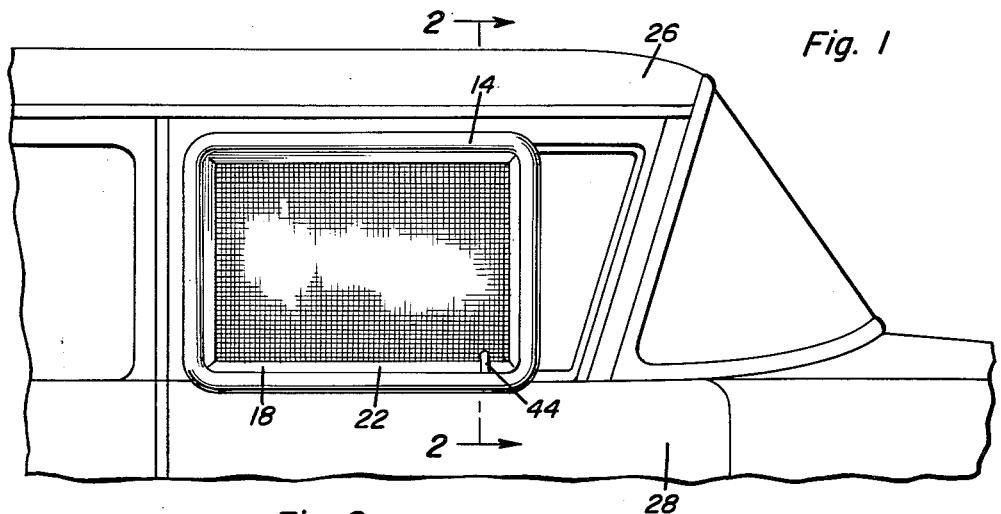
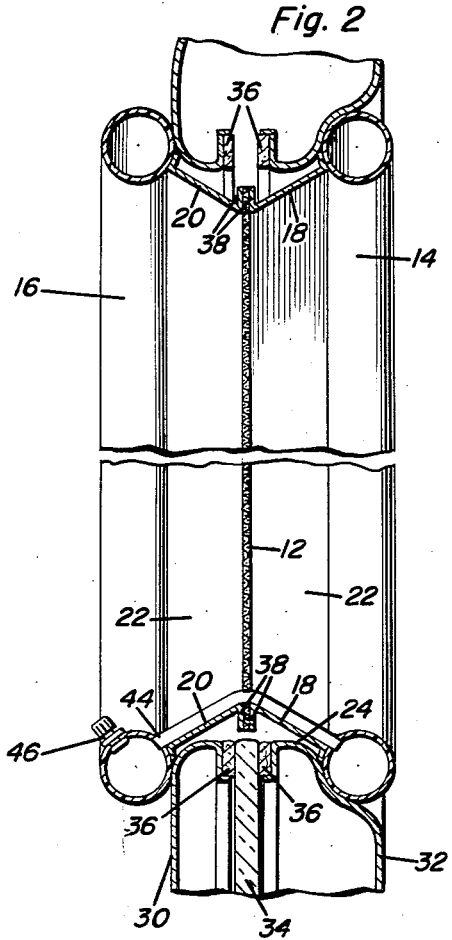
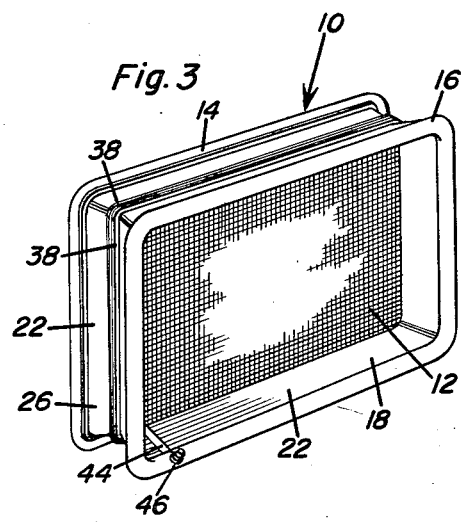
Richard E. Roark
INVENTOR.

3,064,725
AUTOMOBILE WINDOW SCREEN
Richard E. Roark, Williston, N. Dak., assignor of one-third to George J. Hensen, and one-third to Dean Winkjer, both of Williston, N. Dak.
Filed Apr. 20, 1960, Ser. No. 23,464
3 Claims. (Cl. 160—354)

This invention relates to a novel and useful automobile window screen, and more particularly to an automobile window screen provided with resilient spaced retaining frames between which a screen panel is secured and which are adapted to engage the surfaces of a vehicle on opposite sides of and defining a window opening formed therein.

The retaining frames are adapted to overlie the peripheral edges of the window opening and the peripheral edges of the screen panel whereby the screen may be positioned within the window opening and the retaining frames may be positioned in overlying engagement with the surfaces of the vehicle defining the opposite sides of the window opening.

The retaining frames are formed of resilient material so that one of the retaining frames may be deformed sufficiently to pass through the window opening to engage the surfaces of the vehicle defining the other side of the window opening. A screen panel is provided and is secured by means of a pair of flexible mounting sleeves between the spaced retaining frames. Each of the flexible mounting sleeves is to be constructed of a material which will preclude the entrance of insects and the like between each of the retaining frames and the screen panel and the mounting sleeves are provided with inclined walls which converge toward the screen panel and diverge toward one of the retaining frames. The inner ends of the sleeve walls are secured to the peripheral edges of the screen panel and the outer ends of each of the sleeve walls is secured to the adjacent surfaces of one of the retaining frames. In this manner, the screen panel is secured between the retaining frames in spaced and substantially parallel relation thereto. The walls of the mounting sleeves are of a length to limit the spacing between the retaining frames whereby the confronting surfaces thereof will be frictionally engaged with the surfaces of a vehicle on opposite sides of and defining the window opening formed therein.

Each of the retaining frames comprises a sealed hollow frame-like member and it is constructed of a material impervious to air. A connecting tube is secured between and communicates the interiors of the retaining frames and a valve is provided for introducing compressed air into the retaining frames after the window screen construction has been positioned within the window opening. In this manner, the retaining frames may be inflated to increase their frictional engagement with the surfaces of the vehicle defining opposite sides of the window opening thereby providing a weather-tight seal between the retaining frames and the surfaces of the vehicle defining the window opening.

The main object of this invention is to provide a vehicle window screen which may be easily and conveniently positioned within a vehicle window opening.

A further object of this invention is to provide a means for mounting the window screen construction in a vehicle window opening in a manner whereby a weather-tight seal is provided between the periphery of the screen panel and the surfaces of the vehicle defining the window opening.

Yet another object of this invention, in accordance with the preceding objects, is to provide a vehicle window screen construction which may be collapsed and stored in a folded state if desired in the interest of conserving storage space.

A final object to be specifically enumerated herein is to provide a vehicle window screen construction which will conform to conventional forms of manufacture, be of simple construction, and easy to operate so as to provide a device that will be economically feasible, long lasting and operable by substantially every person capable of operating a vehicle.

These together with other objects and advantages which will become subsequently apparent reside in the details of construction and operation as more fully hereinafter described and claimed, reference being had to to the accompanying drawings forming a part hereof, wherein like numerals refer to like parts throughout, and in which:

FIGURE 1 is a fragmentary side elevational view of the side of a vehicle with the window screen construction of the present invention shown mounted in one of the window openings of the vehicle;

FIGURE 2 is a transverse vertical sectional view on somewhat of an enlarged scale taken substantially upon the plane indicated by the section line 2—2 of FIGURE 1; and FIGURE 3 is a perspective view of the screen construction.

Referring now more specifically to the drawings, the numeral 10 generally designates a window screen construction comprising the present invention. It will be noted, see FIGURES 2 and 3, that there is a screen panel 12 provided therein which is disposed between a pair of spaced and substantially parallel retaining frames 14 and 16. Each of the retaining frames 14 and 16 is formed of a resilient material and each comprises a sealed hollow frame-like member.

The screen panel 12 is secured between the retaining frames 14 and 16 by means of a pair of flexible mounting sleeves 18 and 20. Each of the mounting sleeves 18 and 20 is provided with inclined walls 22 which converge toward the screen panel 12 and diverge toward one of the retaining frames 14 and 16. The inner converging ends of the sleeve walls 22 are secured to the panel 12 in any convenient manner and the outer divergent ends of the sleeve walls 22 are secured to the adjacet surfaces of the retaining frames 14 and 16.

It is to be noted that although the screen construction 10 disclosed is substantially rectangular in outline, that it may be constructed of any shape so as to conform to a window opening of similar shape.

The window screen construction 10 is shown mounted in a window opening 24 of the vehicle 26. The window opening 24 is formed in the front door 28 of the vehicle 26. The vehicle door 28 is of conventional design wherein a garnish molding 30 extends around and defines the window opening 24 on the inside of the vehicle 26 and the outerdoor panel 32 defines the outside edges of the window opening 24. A retractible panel of glass 34 is carried within the door 28 for vertical movement between the position in horizontal alignment with the window opening 28 and a lowered position within the lower part of the door 28 below the openng 24. The door 28 is provided with suitable weather-stripping 36 between which the glass panel 34 may be moved.

The inner convergent ends of the sleeve walls 22 are folded back to form pairs of opposing flanges 38 between which the peripheral edges of the screen panel 12 are secured in any convenient manner such as glueing or stitching. The outer divergent ends of the sleeve walls 22 are secured to the retaining frames 14 and 16 in any convenient manner such as gluing.

A flexible connecting tube 40 is secured between the retaining frames 14 and 16 and communicates the interiors thereof. An air valve 46 of any conventional design is secured to the retaining frame 16 for introducing compressed air into the frames 14 and 16.

The sleeve walls 22 are of lengths to restrict the spacing between the retaining frames 14 and 16 to slightly less than the surfaces of the outer door panel 32 and the garnish molding 30 which are engaged by the confronting surfaces of the retaining frames 14 and 16 to increase their frictional engagement with those surfaces. In this manner, when the retaining frames 14 and 16 are inflated, a weather-tight seal is formed between the retaining frames 14 and 16 and the garnish molding 30 and outer door panel 32.

It is to be understood that the sleeve walls 22 will be formed of a flexible material which will resist stretching so that the retaining frames 14 and 16 will be maintained in frictional engagement with the opposite sides of the wndow opening 24.

However, the sleeve walls 22 are not necessary to the operation of the invention which broadly includes the provision of a window screw which may quickly and readily be placed in a vehicle window opening in a manner whereby the peripheral edges of the screen panel will be substantially sealed relative to the edges of the window opening thereby preventing the entrance of insects. If the vehicle panel in which the window opening is formed is relatively thin, it may not be necessary to include the provision of the sleeve walls 22 inasmuch as if the retaining frames 14 and 16 are secured to opposite sides of the panel 12 they may be spaced apart an amount sufficient to engage the surfaces of the vehicle on opposite sides of and about the periphery of a window opening formed therein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A vehicle window screen construction comprising a screen panel adapted to fit in a vehicle window opening, a pair of resilient retaining frames adapted to conform to and overlie the surfaces of a vehicle on opposite sides of and defining said window opening, and means mounting said screen panel between said retaining frames in spaced and substantially parallel relation thereto, said mounting means including a pair of flexible mounting sleeves each conforming to the general shape and outline of said frames and the periphery of said screen panel, said sleeves each having inclined walls converging toward said screen panel and diverging toward one of said retaining frames, the inner ends of said sleeve walls being secured to the peripheral edges of said screen panel and the outer ends of each of said sleeve walls secured to the adjacent surfaces of one of said retaining frames.

2. The combination of claim 1 wherein said sleeve walls are flexible and will resist stretching.

3. The combination of claim 2 wherein said sleeve walls are of a length to limit the spacing between said retaining frames whereby the latter will be retained in frictional engagement with the spaced surfaces of said vehicle defining opposite sides of said window opening.

References Cited in the file of this patent

UNITED STATES PATENTS

| | | |
|---|---|---|
| 2,340,411 | Chorpenning | Feb. 1, 1944 |
| 2,430,873 | Haas | Nov. 18, 1947 |
| 2,700,196 | Panhard | Jan. 25, 1955 |
| 2,840,162 | Moerdyk | June 24, 1958 |